United States Patent [19]

Fujimoto et al.

[11] Patent Number: 5,499,963
[45] Date of Patent: Mar. 19, 1996

[54] AUTOMATIC TOOL CHANGER

[75] Inventors: Akihiko Fujimoto, Yamanashi; Hisao Ishii, Mitaka; Shinya Okamoto, Yamanashi; Naoki Sato, Yamanashi, all of Japan

[73] Assignee: Fanuc Ltd., Yamanashi, Japan

[21] Appl. No.: 119,221

[22] PCT Filed: Jan. 29, 1993

[86] PCT No.: PCT/JP93/00111

§ 371 Date: Sep. 28, 1993

§ 102(e) Date: Sep. 28, 1993

[87] PCT Pub. No.: WO93/14901

PCT Pub. Date: Aug. 5, 1993

[30] Foreign Application Priority Data

Jan. 29, 1992 [JP] Japan ............................ 4-014182
Jun. 23, 1992 [JP] Japan ............................ 4-164927

[51] Int. Cl.⁶ ............................................. B23Q 3/157
[52] U.S. Cl. ................................... 483/56; 483/54
[58] Field of Search ............................ 483/55, 56, 54

[56] References Cited

U.S. PATENT DOCUMENTS

| 4,870,744 | 10/1989 | Araki et al. | 483/56 |
| 4,873,756 | 10/1989 | Yamane et al. | 483/56 |
| 5,134,767 | 8/1992 | Yasuda | 483/56 X |

FOREIGN PATENT DOCUMENTS

| 63-47943 | 9/1988 | Japan . | |
| 2-15936 | 1/1990 | Japan . | |
| 0015935 | 1/1990 | Japan . | 483/56 |
| 3-221341 | 9/1991 | Japan . | |
| 3-264234 | 11/1991 | Japan . | |

OTHER PUBLICATIONS

Patent Abstracts Of Japan, vol. 10, No. 59 (M-459), Mar. 8, 1986 & JP-A-60 205 058.

*Primary Examiner*—Steven C. Bishop
*Attorney, Agent, or Firm*—Nikaido, Marmelstein, Murray & Oram

[57] ABSTRACT

An automatic tool changer for a machine tool comprises a first cam ($C_S$) for swinging a turret (38) by cooperation with a first cam roller (21) mounted on a back face of the turret (38); a second cam ($C_L$) for raising and lowering the turret (38) with respect to the spindle head in a direction along a central axis of the spindle of the machine tool; and a link (6, 8, 14, 16) having a second cam roller (22) cooperating with the second cam ($C_L$), the link raising or lowering the turret (38) with respect to the spindle when the turret (38) is swung by the cooperation between the first cam ($C_S$) and the first cam roller (21) in order to reduce the shock generated at the spindle and the turret (38) at the tool change.

11 Claims, 16 Drawing Sheets

AUTOMATIC TOOL CHANGER

TECHNICAL FIELD

This invention relates to an automatic tool changer used for machine tools such as CNC drills. More particularly, the invention relates to an automatic tool changer which is adapted to decrease the relative velocity between the turret and the spindle of the machine tool sufficiently by moving the turret, relative to the spindle, in the vertical direction when the turret with tools swings toward the spindle for a tool change, whereby the shock generated at the tool change is eliminated. Furthermore, the relative movement between the turret and the spindle in the vertical direction also reduces the distance that the spindle head of the machine tool needs to move, which reduces the time required for the tool change and the dimensions of the machine tool.

Furthermore, the invention relates to an automatic tool changer having a speed reducer within the turret in order to increase the indexing speed of the turret, whereby the time required for changing the tools is reduced.

Furthermore, the invention relates to a speed reducer. More particularly, the invention relates to a novel speed reducer which is suitable for use in the driving unit for the turret of the automatic tool changer.

BACKGROUND ART

Machine tools with an automatic tool changer, in particular CNC drills, are widely used in the field of machine tools. Such automatic tool changers are known, for example, from Japanese Unexamined Patent Publication No. 2-15935 and from Japanese Unexamined Patent Publication No. 2-48146.

A prior art automatic tool changer, as shown in FIG. 16, comprises a turret 74 holding a plurality of tools positioned on its peripheral. When a tool-change command is executed, firstly, orientation is carried out. In orientation, the angular position of a key on a spindle, on which a tool (or tool holder) 70 is mounted, is adjusted to a given angular position. Sequentially, a spindle head 60 is raised with the angular position of the spindle maintained. As the spindle head is raised, a cam 62 is engaged with a lever 64, then the lever 64 is rotated by the cam 62. The rotation of the lever 64 is transmitted to a crank 68 through a link 66 provided on an end of the lever 64. Thus, the crank 68 rotates (in the following, the rotation of the crank and the turret is referred to as a swing movement), and a grip 72 arranged on the periphery of the turret 74 approaches the tool holder 70 mounted on the spindle. Then, the grip 72 engages with the tool holder 70 and grasps it. Thereafter, the spindle head 60 is further raised so that the tool holder 70 is removed from the spindle. When the tool holder 70 removed from the spindle, an indexing of the turret 74 is carried out by the rotation of the spindle with a spindle gear 76 being engaged with a turret gear 78. Thus, a desired tool is selected from among the tools held on the turret 74. Sequentially, the spindle head 60 is lowered and the turret gear 78 is disengaged from the spindle gear 76, during which another orientation is carried out in order to correct the discrepancy of the angular position of the spindle, since the angular position of the spindle may be different from the given angular position due to the rotation of the spindle for indexing the turret. When the spindle head 60 is lowered, the tool holder grasped by the grip 72 is mounted on the spindle and the tool change operation is completed.

The conventional automatic tool changer generates shock due to the swing movement of the turret 74 when the grip 72 grasps the tool holder mounted on the spindle or the tool holder grasped by the grip 72 is mounted on the spindle. In order to reduce the shock, in the conventional automatic tool changer, the feed velocity of the vertical movement of the spindle head is reduced when the shock is generated. Thus, the conventional automatic tool changer has a disadvantage that it takes long time for a tool change because of the reduction of the feed velocity.

Furthermore, in order to remove the tool holder from the spindle, in the conventional automatic tool changer, the spindle head 60 must be raised higher until the tool holder is completely removed after the grip grasps the tool holder mounted on the spindle. On the other hand, the spindle head must be lowered until the tool holder is completely mounted on the spindle when the tool holder is mounted on the spindle. Therefore, a long feed length is required in the conventional automatic tool changer. Thus, the conventional automatic tool changer has the further disadvantages that the machine tool is high and the time for tool change is long.

In the prior art, the turret is driven by the spindle, the speed of which is reduced to about 30 rpm without a speed reducer between the turret and the spindle. However, the electric motor, typically a spindle motor, used as an drive source for such an automatic tool changer has a characteristic that the generated power is proportional to the speed of the motor when the motor rotates at a speed under 1500 rpm, that is, the generated torque is constant under 1500 rpm. Therefor, if the turret is driven by the spindle which is rotating at 30 rpm then the power is not enough for a high-speed tool change.

It is obvious that this problem can be solved by providing a compact speed reducer within the turret. The speed reducer within the turret does not require high accuracy or high transmission efficiency for indexing the turret during a tool change.

There are various known speed reducers, such as a multiple gear box, a worm gear device, a bevel gear device, a planetary gear (epicyclic gear) device, a roller gear cam device, and the others. The multiple gear box has high transmission efficiency. However, it has a plurality of gears. The worm gear device has high reduction ratio. However, it has an input axis and an output axis arranged at right angle to each other. Thus, the above two devices tend to have relatively large dimensions. A device having a combination of bevel gears and a device using planetary gears cannot provide the high reduction ratio required for the automatic tool changer. The roller cam gear device can provide a high reduction ratio and high accuracy without back-lash. However, it is a large and expensive device since it has a plurality of axes and complicated roller grooves must be formed on the drive axis thereof.

Therefore, conventional speed reducers are too complicated and large to be arranged within the turret. It is also difficult t o reduce the time required for a tool change by providing the desired reduction ratio. That is, it is difficult to increase the velocity of the turret during a tool change by the conventional speed reducer. Furthermore, from a viewpoint of a cost, because of the high quality, the conventional speed reducer is not suitable as a speed reducer adapted to drive the turret of an automatic tool changer.

DISCLOSURE OF THE INVENTION

Thus, the object of the invention is to provide an automatic tool changer which is constructed so as to eliminate, or to reduce as much as possible, the shock generated during a tool change while using a relatively high velocity of the spindle head, and to change tools with a shorter travel of the spindle head than the conventional automatic tool changer, whereby to provide an automatic tool changer which can change tools quickly.

A further object of the invention is to provide an automatic tool changer which can change tools quickly, the turret thereof comprising a compact speed reducer with reduction ratio of 6:1 or so, which can manufactured with relatively easily and is inexpensive while its transmission efficiency is not high.

Yet further object of the invention is to provide a compact speed reducer with reduction ratio of 6 or so which can be manufactured with relatively easily and is inexpensive while its transmission efficiency is not high.

In order to achieve the above objects, there is provided an automatic tool changer for a machine tool comprising a turret, holding a plurality of tools by means of grips arranged on the peripheral thereof, and supported for rotation about an axis, the automatic tool changer selecting the desired tool by indexing of the turret and changing tools between the desired tool and a tool mounted on a spindle of the machine tool by the turret swinging toward and away from the spindle, the automatic tool changer comprising:

- a first cam means provided on a spindle head of the machine tool for swinging the turret in cooperation between a first cam roller means mounted on a back face of the turret for rotation about an axis;
- a second cam means provided on the spindle head for raising and lowering the turret with respect to the spindle head in a direction along the central axis of the spindle of the machine tool; and
- a link means, having a second cam roller means cooperating with the second cam means, such that when the spindle head is raised or is lowered and the turret swings based on the cooperation between the second cam means and the cam roller, the link means receives a force generated by the cooperation between the second cam means and the second cam roller means and raising or lowering the turret with respect to the spindle in the direction along the central axis of the spindle, the relative velocity between the turret and the spindle head is reduced.

The first cam means may be extended parallel to the central axis of the spindle and comprise first and second flat bearing faces and a third bearing face arranged between the first and the second bearing faces and having externally convex configuration.

The first and second bearing faces may be integrally formed or separately formed each other.

The second cam means may be of a type having a hook-shaped groove composed of a straight portion extended generally parallel to the central axis of the spindle and a curved portion.

Furthermore, the turret may comprise a rotating shaft provided with a coaxial-type speed reducer having a reduction ratio of a integral number of 2:1 or more.

The speed reducer may comprise:

- plurality of ball means transmitting the driving force, the number of the ball means corresponding to the number of the reduction ratio plus one;
- a driving cam means containing a first cam groove which engages with the ball means and has a circular configuration, the center of the circle being eccentrically positioned with respect to the axis of the speed reducer;
- a follower cam means containing a second cam means having a plurality of convex and concave portions, the number of the convex portions corresponding to the reduction ratio;
- a holder means provided with a plurality of equally spaced radial grooves, the number of which corresponds to the number of the reduction ratio plus one, each of the grooves allowing the respective ball means to move in the radial direction; and
- the driving cam means and the follower cam means connected to each other with the holder means therebetween, the sides of each the cam means formed with the respective grooves facing each other whereby the rotation of the driving cam means is transmitted to the follower cam means, and reduced, through the ball means.

Furthermore, there is provided a speed reducer having reduction ratio of integral numbers of 2:1 or more, the speed reducer comprising:

- a plurality of ball means transmitting the driving force, the number of the ball means corresponding to the number of the reduction ratio plus one;
- a driving cam means containing a first cam groove which engages with the ball means and has a circular configuration, the center of the circle being eccentrically positioned with respect to the axis of the speed reducer;
- a follower cam means containing a second cam means having a plurality of convex and concave portions, the number of the convex portions corresponding to the reduction ratio;
- a holder means provided with a plurality of equally spaced radial grooves, the number of which corresponds to the number of the reduction ratio plus one, each of the grooves allowing the respective ball means to move in the radial direction; and
- the driving cam means and the follower cam means connected to each other with the holder means therebetween, the sides of each the cam means containing the respective grooves facing each other whereby the rotation of the driving cam means is transmitted to the follower cam means, and reduced, through the ball means.

BEST MODE FOR CARRYING OUT THE INVENTION

Figure 1:
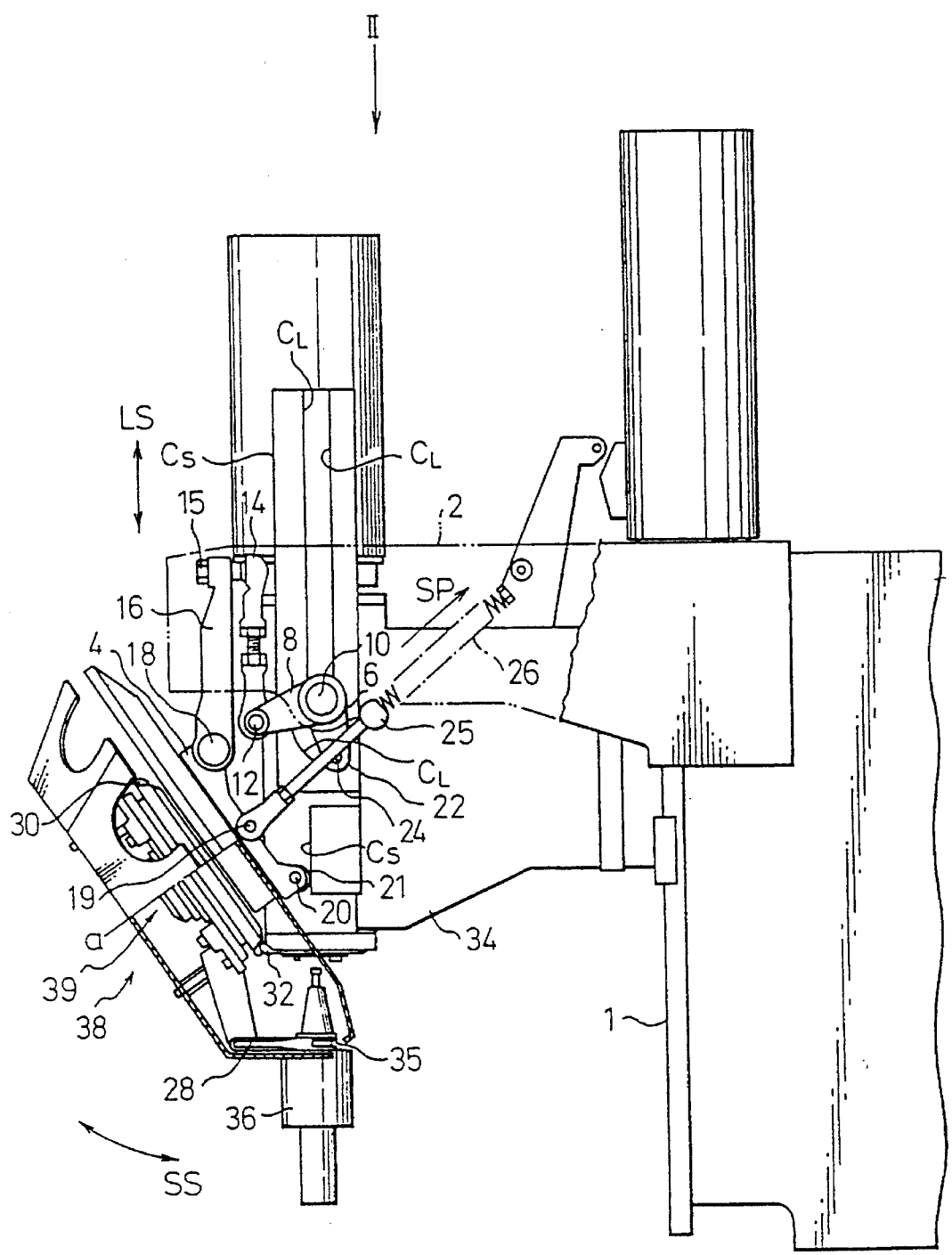
FIG. 1 is a side elevation of an automatic tool changer, in accordance with the invention, used for a CNC drill.
Figure 2:
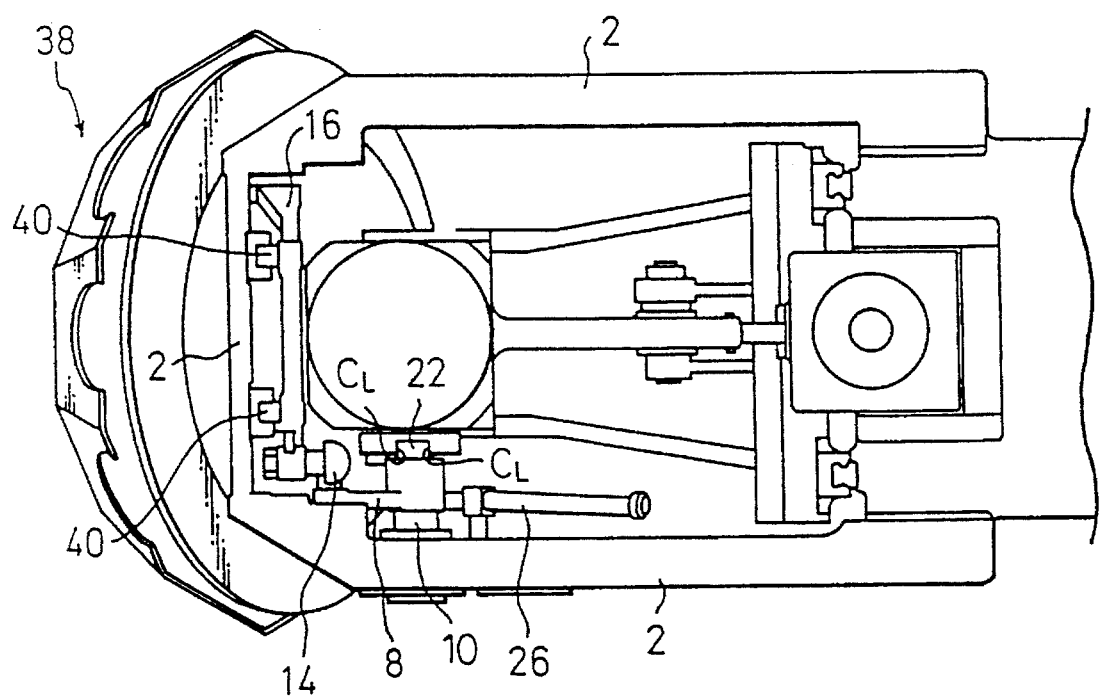
FIG. 2 is a plan view of an automatic tool changer in accordance with the invention, used for a CNC drill viewed from the arrow II in FIG. 1.

Referring to FIGS. 1 and 2, a CNC drill provided with an automatic tool changer in accordance with the invention comprises a spindle head 34 rotationally holding a spindle on which a tool for machining is mounted. The spindle head 34 is arranged so as to be raised or lowered in the vertical direction on guide rails 1. The automatic tool changer in accordance with the invention has a generally U-shaped arm member 2, and a turret 38 having a plurality of grips 28 on periphery thereof. Each tool is held in a respective grip 28. The turret 38 can rotate a bout an axis "a" in order to select the desired tool. The turret also comprises a speed reducer 39 of the coaxial type. The speed reducer 39 is mounted within the turret coaxially with the axis "a". Rotation of the spindle of the CNC drill is transmitted to the speed reducer 39 through a turret gear 30 and a spindle gear 32. The speed reducer 39 reduces and transmits this rotation to the turret 38.

In the following, a description is made of one embodiment of the invention in which the turret 38 can hold 10 tool holders on its periphery.

In FIG. 1 and 2, the automatic tool changer is mounted on the spindle head 34 which can move in the vertical direction. The automatic tool changer comprises a first cam (in the following, referred to as a swing cam) $C_S$ for swinging a crank 4 a bout a shaft 18 in a direction indicated by an arrow SS and a second cam (in the following, referred to as a lift cam) $C_L$ for moving the crank 4 in a direction indicated by an arrow LL. The crank 4 is secured on a back face of the turret 38 holding tool holders 36 through grips 28. Thus, the turret 38 can move in the both directions indicated by arrows SS and LS.

A first cam roller (in the following, referred to as a swing roller) 21 is rotationally mounted on the crank 4 about a shaft 20 at the opposite end to the shaft 18. The swing roller 21 cooperates with the swing cam $C_S$. A spring means 26 is attached to the crank 4 at the generally center portion thereof by a pin 19. The crank 4 is biased by the spring means 26 in a direction indicated by an arrow SP about the shaft 18.

That is, the swing roller 21 is pressed onto a bearing face of the swing cam $C_S$ by the spring means 26. The above arrangement allows turret 38 to swing in the direction of the arrow SS in accordance with the configuration of the swing cam $C_S$ when the swing roller 21 is moved relatively to the swing cam $C_S$ which bears on the bearing face.

The shaft 18 is connected to a lift slider 16. The lift slider 16 can move in the vertical direction, indicated by an arrow LS, along a linear guide 40 attached to the arm member 2. A lift link 14 is attached to the lift slider 16 at the opposite end to the shaft 18. The lift link 14 can move in the direction of the arrow LS with the lift slider 16. A lift lever is attached to the lift link 14 at the opposite end to a bolt 15 by a pin 12. The lift lever comprises two arm members 8, 6 and can rotate about shaft 10. The shaft 10 is attached to the arm member 2 horizontally. The lift lever 6, 8 is attached to the shaft and can rotate in the direction of an arrow LL shown in FIG. 3 (referring to FIG. 3). A second cam roller 22 (in the following, referred to as a lift roller) is attached to the arm member 6 of the lift lever at the opposite end to the shaft 10. The lift roller 22 engages with the lift cam $C_L$ and can rotate about a shaft 24. The above arrangement allows lift link 14 and lift slider 16 to be raised and lowered in the direction of the arrow LS which leads to a movement of the turret 38 in the direction of the arrow LS (in the following, this movement of the turret 38 is referred to as a lift movement) when the lift roller 22 is moved in the direction LL by the engagement with the lift cam $C_L$, that is, the lift link 6, 8 rotates in the direction of the arrow LL about the shaft 10.

Figure 4:
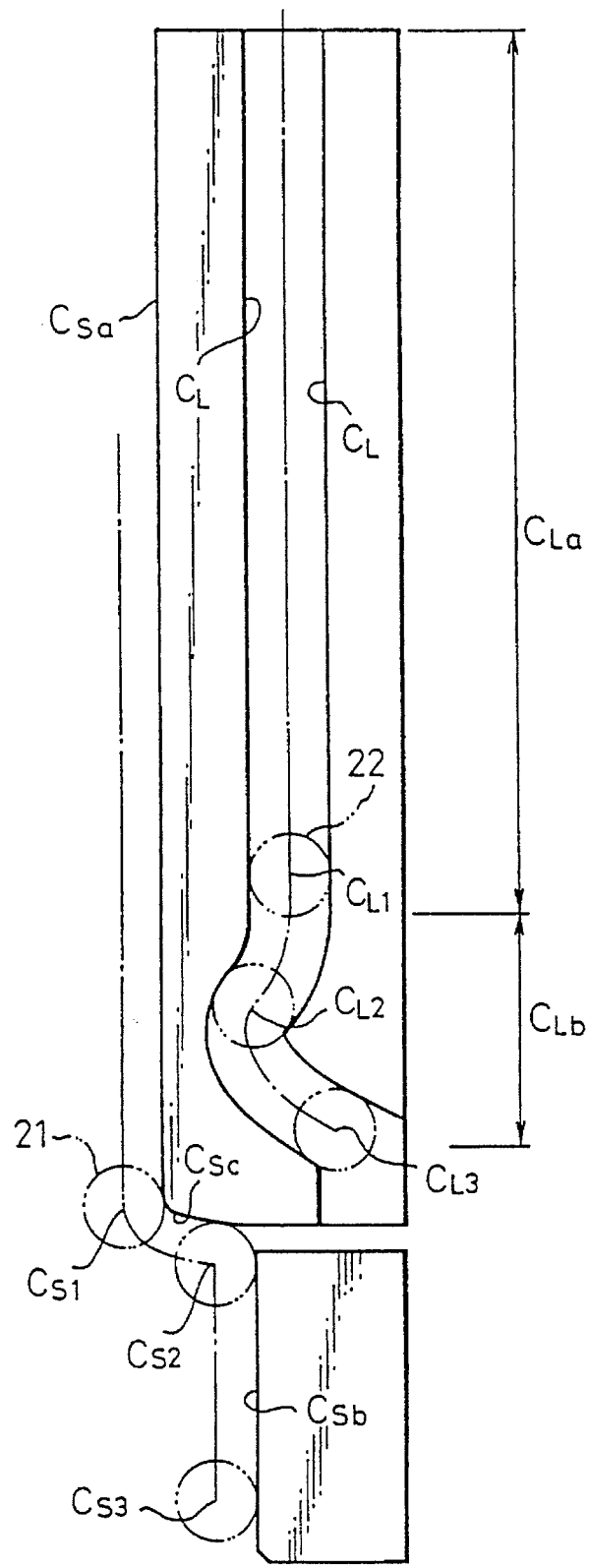
FIG. 4 is enlarged view of the swing cam and the lift cam used for an automatic tool changer in accordance with the invention.

In the following, a description is made of the two cams $C_S$ and $C_L$ used for the automatic tool changer in accordance with the invention (referring to FIG. 4). The swing cam $C_S$ comprises first and second bearing faces $C_{Sa}$ and $C_{Sb}$ which are arranged at two levels and extended parallel to the center axis of the spindle of the CNC drill (in the following, referred to as Z-axis), and a third bearing face $C_{Sc}$ which has convex configuration and substantially regulates the movement of the turret 38 as can be understand from FIG. 4.

In the following, a description is made of the movement of the turret 38 by the cooperation between the swing cam $C_S$ and the swing roller 21. At first, turret 38 does not move and is kept in a waiting position while the swing roller 21 is on the bearing face $C_{Sa}$ (referring to FIG. 3). Once the swing roller 21 reaches the starting point ($C_{S1}$) of the cam surface $C_{Sc}$, the turret 38 starts swinging toward the spindle of the CNC drill about the shaft 18 corresponding to the movement of the swing roller 21 along the cam surface $C_{Sc}$. In the following, the assumption is made that the the origin of the Z-axis is defined when the swing roller 21 is at $C_{S1}$. When the swing roller 21 is abutted to the cam surface $C_{Sb}$ (the center of the swing roller 21 is indicated by $C_{S2}$) after moving along the cam surface $C_{Sc}$, the swing movement of the turret 38 toward the spindle of the CNC drill is stopped. At this time, the grip 28 engages sufficiently with the V-shaped groove 35 of the tool holder 36 and grasps the tool holder 36. It is apparent that the two bearing face $C_{Sa}$ and $C_{Sb}$ can be formed as one body although they are shown as separated bodies in FIG. 4.

On the other hand, the lift cam $C_L$ is a hook-shaped groove cam having a straight portion $C_{La}$ and a curved portion $C_{Lb}$. The lift roller 22 contacts the inner surface of the groove and rolls in the groove.

In the following, a description is made of the relationship between the movements of the lift cam $C_L$ and the turret 38.

When the lift roller 22 is in the straight portion $C_{La}$ of the lift cam $C_L$, the lift lever 6, 8 does not move, therefore the turret 38 does not lift. When the lift roller 22 reaches the first portion ($C_{L1}$ to $C_{L2}$) of the curve d portion $C_{Lb}$, the arm member 6 of the lift lever starts to rotate in a clockwise direction which raises the lift link 14 and the lift slider 16 in the direction of the arrow LS. Thus, the turret 38 moves in the up-ward direction. When, the lift roller 22 reaches to the second portion ($C_{L2}$ to $C_{L3}$) of the curved portion $C_{Lb}$, the arm member 6 of the lift lever rotates in the counter-clockwise direction which lowers the lift link 14 and the lift slider 16. Thus, the turret 38 is lowered. That is, the turret 38 moves in the down-ward direction. When the swing roller 21 reaches $C_{S1}$, the lift roller 22 is at $C_{L1}$ shown in FIG. 4.

Figure 3:
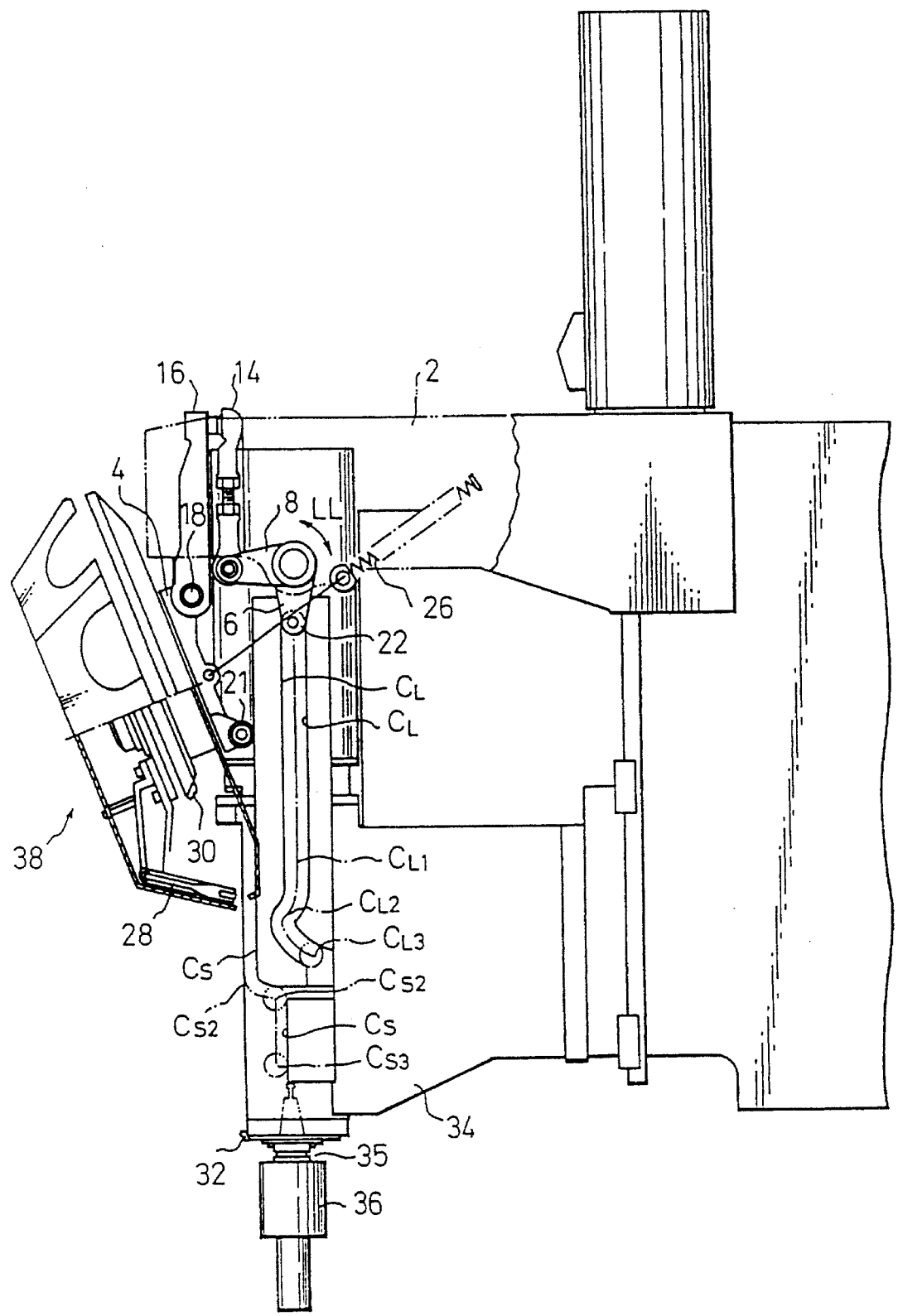
FIG. 3 illustrates the arrangement of cams of an automatic tool changer, in accordance with the invention, with the spindle head of the CNC drill of FIG. 1 lowered to the lowest point.
Figure 5A:
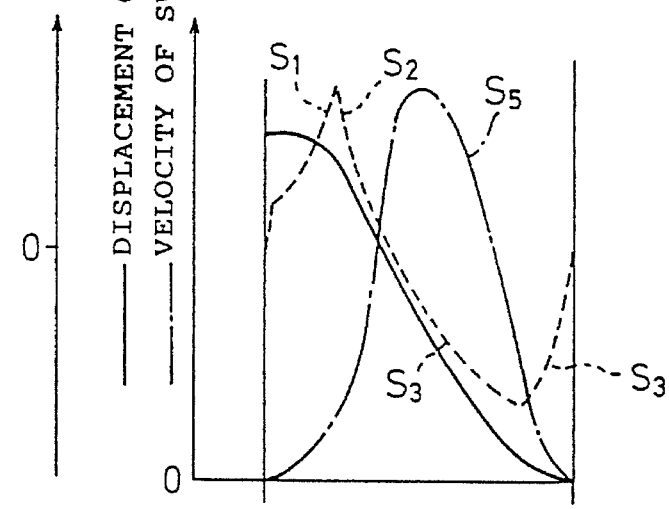
FIG. 5 illustrates the relationship between the swing cam and the swing movement of the turret.
Figure 5B:
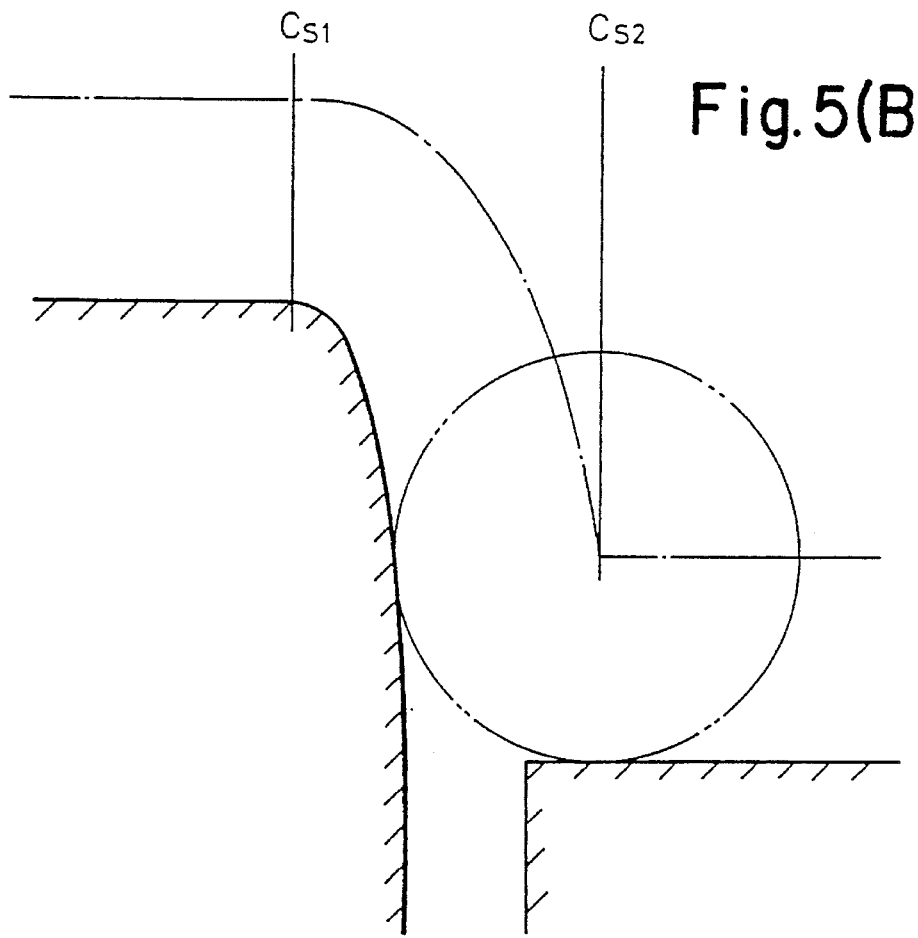
Figure 6A:
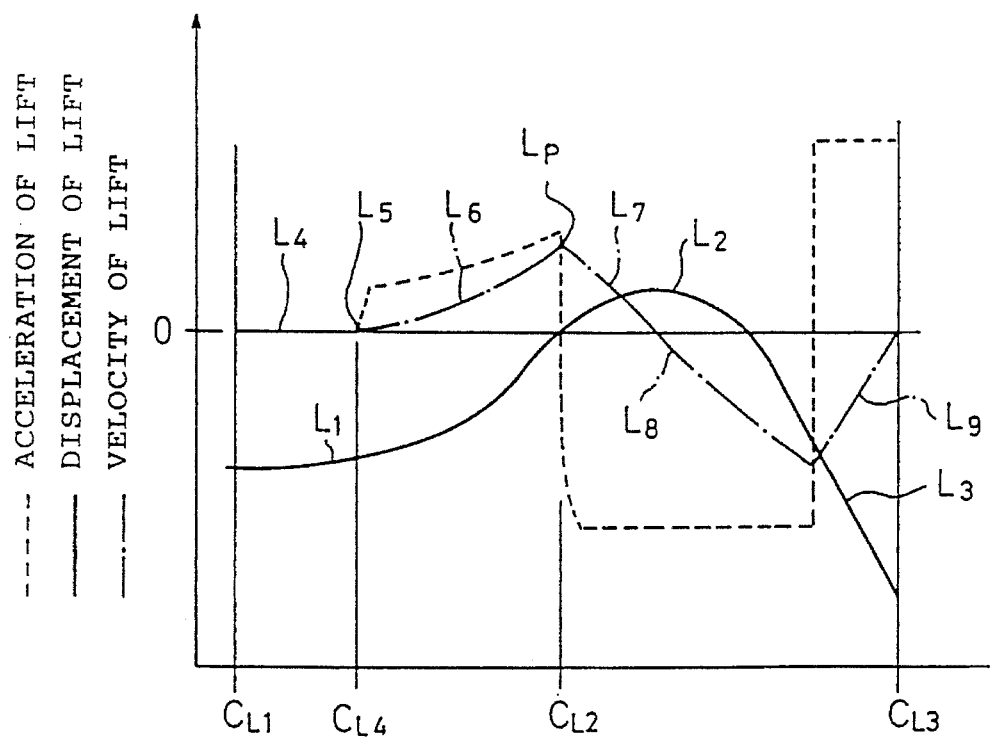
FIG. 6 illustrates the relationship between the lift cam and the lift movement of the turret.
Figure 6B:
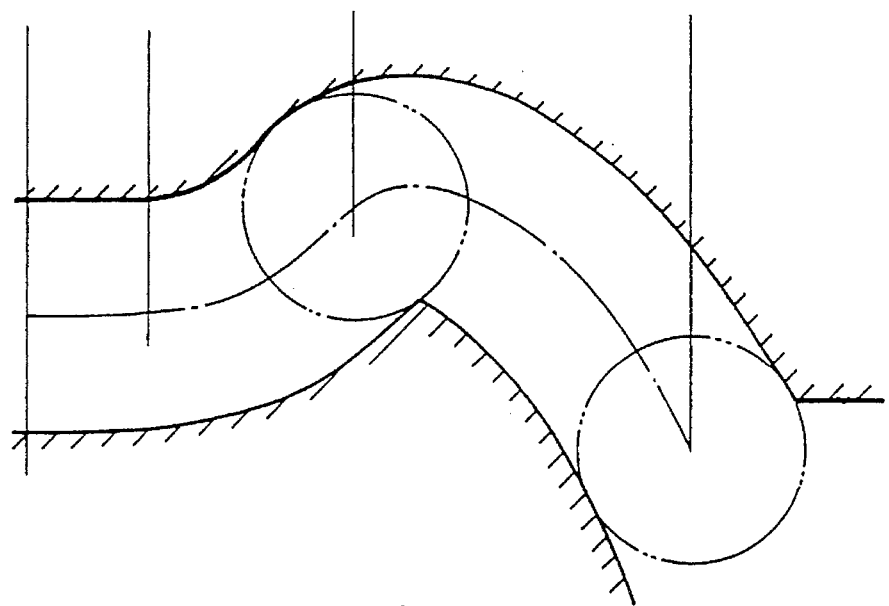

In the following, a description is made of the tool change action of the automatic tool changer in accordance of the invention, with reference to FIG. 3, in which the spindle head 34 is shown at the lowest position, for understanding the configuration of the cams. The description is also made with reference to FIG. 5 and 6 showing the relationship of the respective cams to the displacement, the displacement velocity, and the displacement acceleration of the swing and lift movements.

Firstly, the orientation of the spindle is carried out when the tool change command is executed from a CNC drill controller (not shown). At the same time, the spindle head 34 is quickly raised. The swing roller 21 approaches the starting position $C_{S1}$ of the swing movement, that is, the origin of the Z-axis along the first bearing face $C_{Sa}$ of the swing cam $C_S$. When the swing roller 21 reaches $C_{S1}$, the spindle head 34 stops and waits for the end of the spindle orientation. When the spindle orientation is completed, the spindle head 34 is raised again. During this operation, the lift roller 22 is on the straight portion $C_{Ls}$ of the lift cam $C_L$ extending parallel to the Z-axis and the lift movement is not carried out (shown by a portion $L_1$ in FIG. 6).

Thereafter, the spindle head 34 is further raised and the swing roller 21 approaches the third bearing face $C_{Sc}$ of the cam $C_S$. At this time, the turret 38 starts swinging in the clockwise direction about the rotation shaft 18. The third bearing face $C_{Sc}$ is formed so that the free ends of the grip 28 approach the V-shaped groove 35 of the tool holder 36 without contacting the spindle gear 32 and then rollers (not shown) provided at the free ends of the grip 28 trace accuracy along the V-shaped groove 35 after the rollers engage with the groove. Furthermore, it is desired that the configuration of the third bearing face of the swing cam $C_S$ is such that t he free ends of the grip 28 swing along a shortest path.

Then, the spindle head 34 is raised at a displacement velocity and is accelerated linearly as the swing roller 21 moves from $C_{S2}$ to $C_{S1}$. During this operation, the acceleration of the swing movement of the turret 38 (indicated by $S_1$, $S_2$ in FIG. 5) is an acceleration defined by the configuration of the swing cam and the linear acceleration of the spindle head 34.

It is apparent from the construction of the turret 38 and the swing cam $C_S$ shown in FIG. 1, that the velocity of the movement of the turret 38 is defined by the configuration of the swing cam $C_S$ and the relative velocity between the swing cam $C_S$ and the swing roller 21. Therefore, the swing movement of the turret 38 is decelerated if the turret 38 moves in the same direction of the movement of the spindle head 34 just before the end of the swing movement (indicated by $S_5$ in FIG. 5), which leads the reduction in relative velocity therebetween. This allows the swing movement to be completed without shock being generated on the grip 28 and tool holder 34 and without the velocity of the spindle head 34 being reduced. To realize this, during the deceleration of the swing movement ($S_3$ in FIG. 5 and between $C_{LA}$ and $C_{L2}$ in FIG. 6), the lift lever 6, 8 is rotated in the counter-clockwise direction about the shaft 10 by the engagement between the lift roller 22 and a portion from $C_{LA}$ to $C_{L2}$. The rotation results in a rising movement of the lift link 14 and the lift slider 16 and in the acceleration of the crank 4, that is, of the turret 38 in the same direction as the rising movement of the spindle head 34 (indicated by $L_6$ in FIG. 6). Thus, relative velocity of the turret 38 to the spindle head 34 rising in the Z-axis is substantially 0 (the velocity of the turret 34 is indicated by $L_p$ and the spindle head 34 also moves at a velocity indicated by $L_p$) at the end of the swing movement, that is when the swing roller 21 is at $C_{S2}$ (also indicated by $C_{S2}$ in FIG. 5) and the lift roller 22 is at $C_{L2}$ (also indicated by $C_{L2}$ in FIG. 6). Thus, the shock described above is considerably reduced or removed. This is an important advantage of the invention.

After the end of the swing movement, the spindle head 34 is rapidly raised to a point where the turret carries out the indexing. At the same time, the turret 38 starts a further movement in the downward direction to draw out the tool holder 36 from the spindle. During this operation, the swing roller 21 moves from $C_{S2}$ to $C_{S3}$ and the lift roller 22 moves from $C_{L2}$ to $C_{L3}$. That is, the direction of the acceleration of the lift movement is reversed to the movement in the Z-axis (the acceleration becomes negative) and the lifting movement is decelerated after the lift roller 22 is beyond the point $C_{L2}$ in FIG. 6. The crank, firstly, is raised ($L_2$ in FIG. 6), then starts to move in downward direction ($L_3$ in FIG. 6) since the crank has a velocity in the same direction as the rising movement of the spindle head 34. During this operation, the acceleration of the crank 4 is a linear acceleration in order to minimize the variations in the acceleration ($L_8$ and $L_9$).

It is an important advantage of the invention that the automatic tool changer can draw out the tool holder 36 from the spindle in a shorter distance than the conventional automatic tool changer since the crank 4 and the turret 38 carry out the lift movement in a downward direction related to the spindle head 34.

After the end of the rising movement of the spindle head 34 (shown in FIG. 1), indexing is carried out by rotating the spindle, for selecting the desired tool, with the spindle gear 32 of the CNC drill engaged with the turret gear 30 of the speed reducer 39. The angular position of the spindle corresponds to the orientation of the spindle when the indexing of the turret is completed since one indexing is carried out by one rotation of the spindle through the speed reducer 39 as described later.

After the end of the indexing of the turret, the spindle head 34 is lowered to the origin of the Z-axis following a sequence opposite to that described above. Thus, the relative velocity of the turret 38 to the velocity of the lowering movement of the spindle head 34 is substantially 0, when the spindle receives the tool holder 36 from the grip 28.

The spindle head 34 returns to the origin at the same time that the reverse swing movement of the turret 38, and thus the operation of the tool change, is completed.

Figure 7:
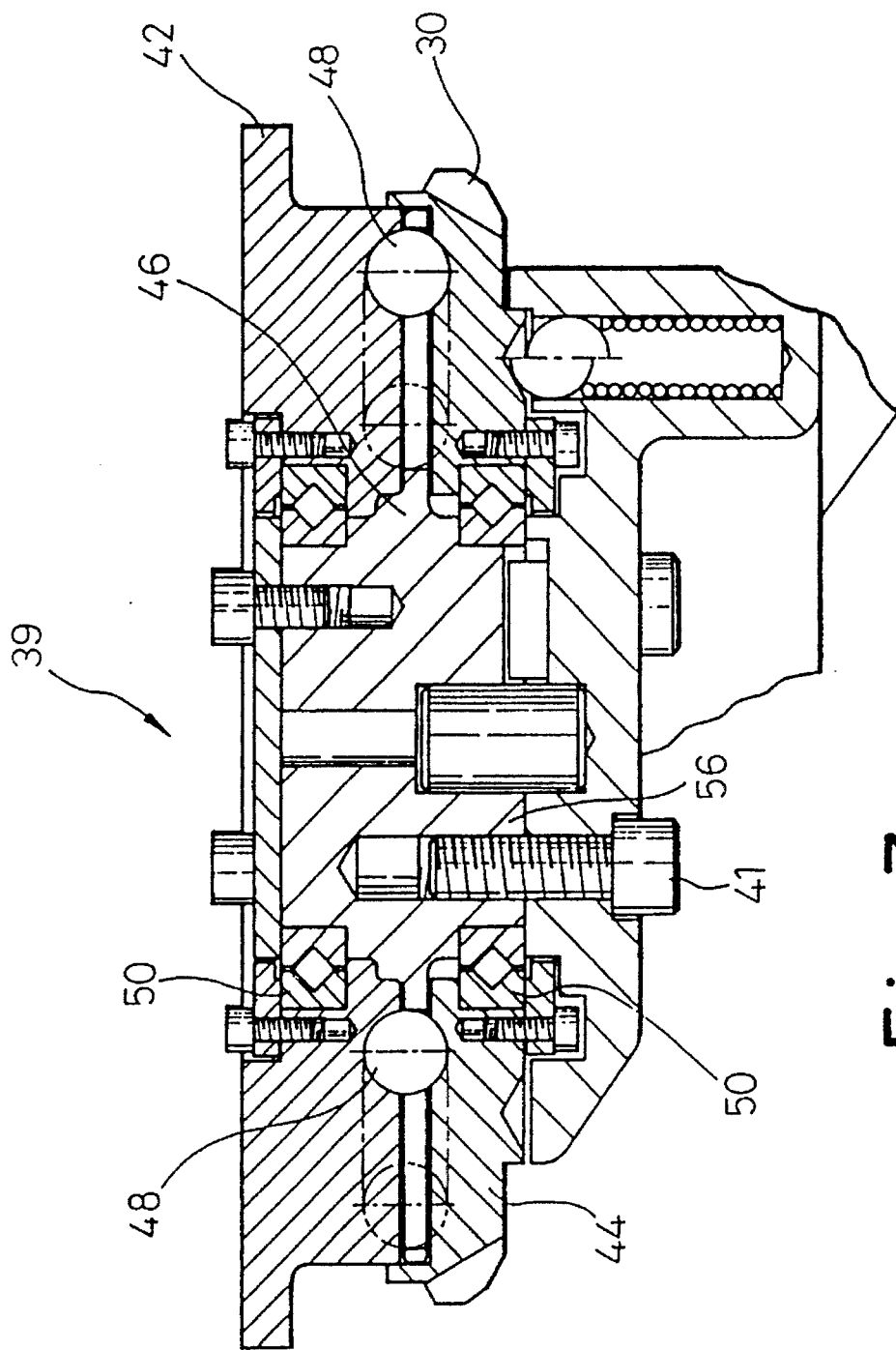
FIG. 7 is sectional view of the speed reducer in accordance with the invention.

In the following, a description is made of the speed reducer 39 with reference to FIG. 7. The speed reducer 39 comprises a driving cam 44, a follower cam 42 and a holder 46 between the driving cam 44 and the follower cam 42. The driving cam 44 and the follower cam 42 are rotatably connected to the holder 46 about a common axis by a bearing means such as a ball bearing.

Referring to FIG. 8, a second cam groove 52 is formed on the follower cam 42. A first cam groove 58 is formed on the driving cam. The holder 46 contains ball slots 54. One ball 48 is held in each of the ball slots 54. The speed reducer is assembled so that the balls 48 engage with the first and the second grooves. The rotation of the driving cam 44 is reduced and is transmitted to the follower cam 42 through the movement of the balls 48 as described below.

Figure 8C:
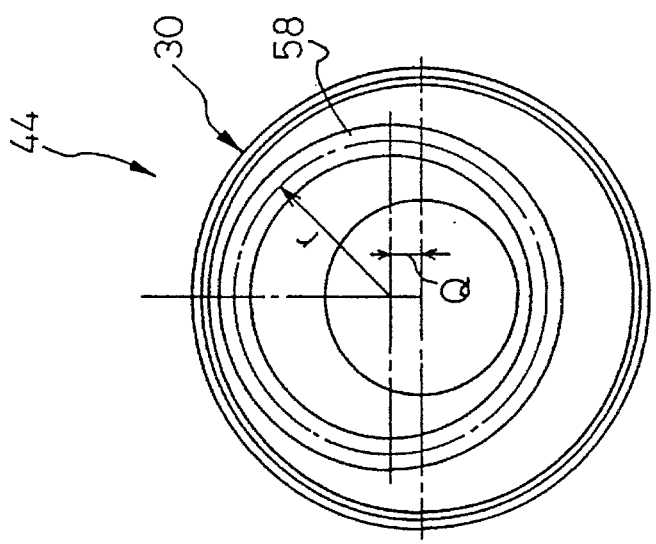
FIG. 8(a), 8(b) and 8(c) are front view of the follower cam, the holder and the driving cam of the speed reducer shown in FIG. 7 respectively.

The driving cam 44 comprises a generally circular member with the turret gear 30 on its periphery as shown in FIG. 8(c). The turret gear 30 engages with the spindle gear 32 on the spindle. The driving cam contains the first cam groove 58 which engages with the balls 48. The first cam groove 58 is a generally a circular groove with a radius "r" and a center eccentrically positioned from the axis of the driving cam 44 by a distance Q. The formula representing the configuration of the first cam groove with respect to an angle θ about the axis of the speed reducer will be described later.

Figure 8B:
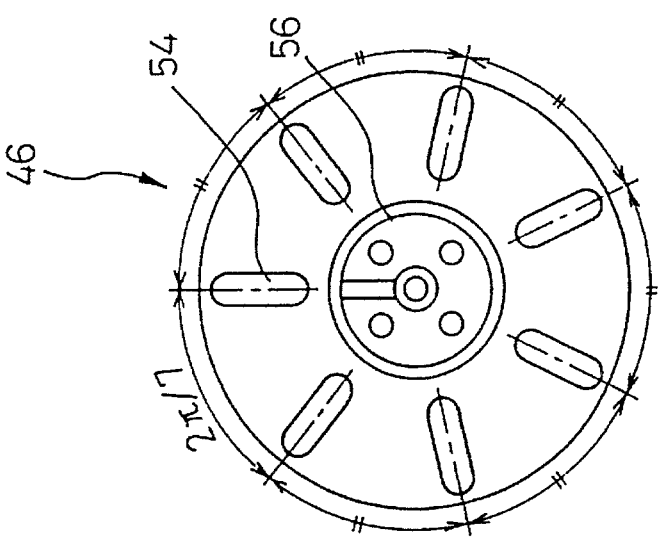

In FIG. 8(b), the holder 46 comprises a generally circular member provided with an island 56 having a means 41 for mounting onto a given position of the turret 38 so as to prevent the rotation of the holder 46. The holder 46 has n+1 ball slots 54 while the reduction ratio is n:1 (n=2,3,4, . . . ). The ball slots 54 is radially extended and equally positioned. FIG. 8(b) illustrates the holder when the reduction ratio is 6:1 as one embodiment of the invention.

The ball slot 54 has an axial length substantially twice the distance Q between the axis O of the driving cam 44, that is, the axis of the speed reducer, and the center point O' of the eccentrically positioned circle of the first cam groove 54. A ball 48 is held in each of the ball slots 54. The movement of the ball 48 relative to the movement of the driving cam 44 is constrained in the radial direction by the ball slot 54. That is, each of the balls 48 reciprocates once in the respective ball slots 54 for each rotation of the driving cam 44.

Figure 8A:
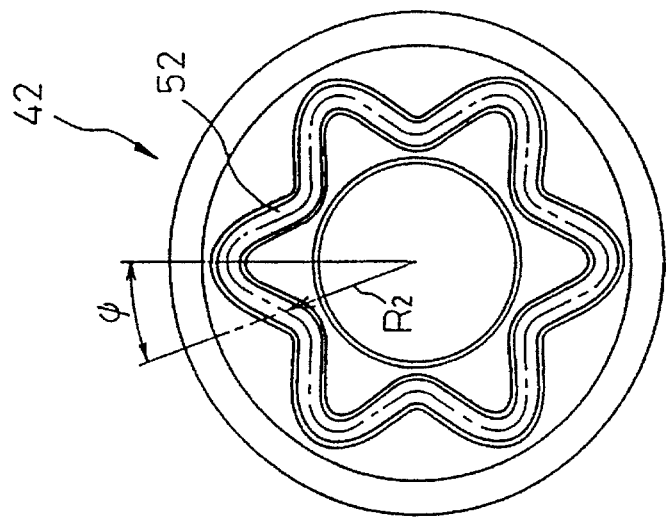

In FIG. 8(a), the follower cam 42 comprises a generally circular member provided with the second cam groove 52 a plurality of radial convex and concave portions of which the number corresponds to the reduction ratio n. In FIG. 8(a), the reduction ratio of the speed reducer containing the cam is 6. The formula representing the configuration of the second cam groove with respect to an angle φ about the axis will be described later.

In the following, a description is made of the principle of the operation of the speed reducer 39. As can be seen from the description for the construction of the speed reducer, during one rotation of the driving cam 44, each ball held in the respective ball slots 54 of the holder 46 reciprocates once in the respective ball slots 54, in the radial direction, while engaging with the first cam groove 58 of the driving cam 44 and the second cam groove 52 of the follower cam 42. This movement of each ball 48 in the respective ball slot 54 is converted into a partial rotation of the follower cam with respect to the central angle φ in the formula representing the configuration of the second cam groove 52, for example, one of the balls 48 moves from peak to peak of the second cam groove. That is, since the second groove contains n convex and concave portions, one rotation of the driving cam is converted into 2 π/n rotation of the follower cam. For example, in the particular embodiment illustrated, since n=6, the follower cam 42 rotates ⅙ rotation for one rotation of the driving cam 44. Thus, reduction of ⅙ is obtained. Furthermore, if the reduction ratio between the spindle gear 32 and the turret gear 30 is 1:1.6667 when 10 tool holders are held on the peripheral of the turret, then one tool is selected with one rotation of the spindle during the indexing. Consequently, the angular position of the spindle corresponds to that of before the indexing.

Figure 9:
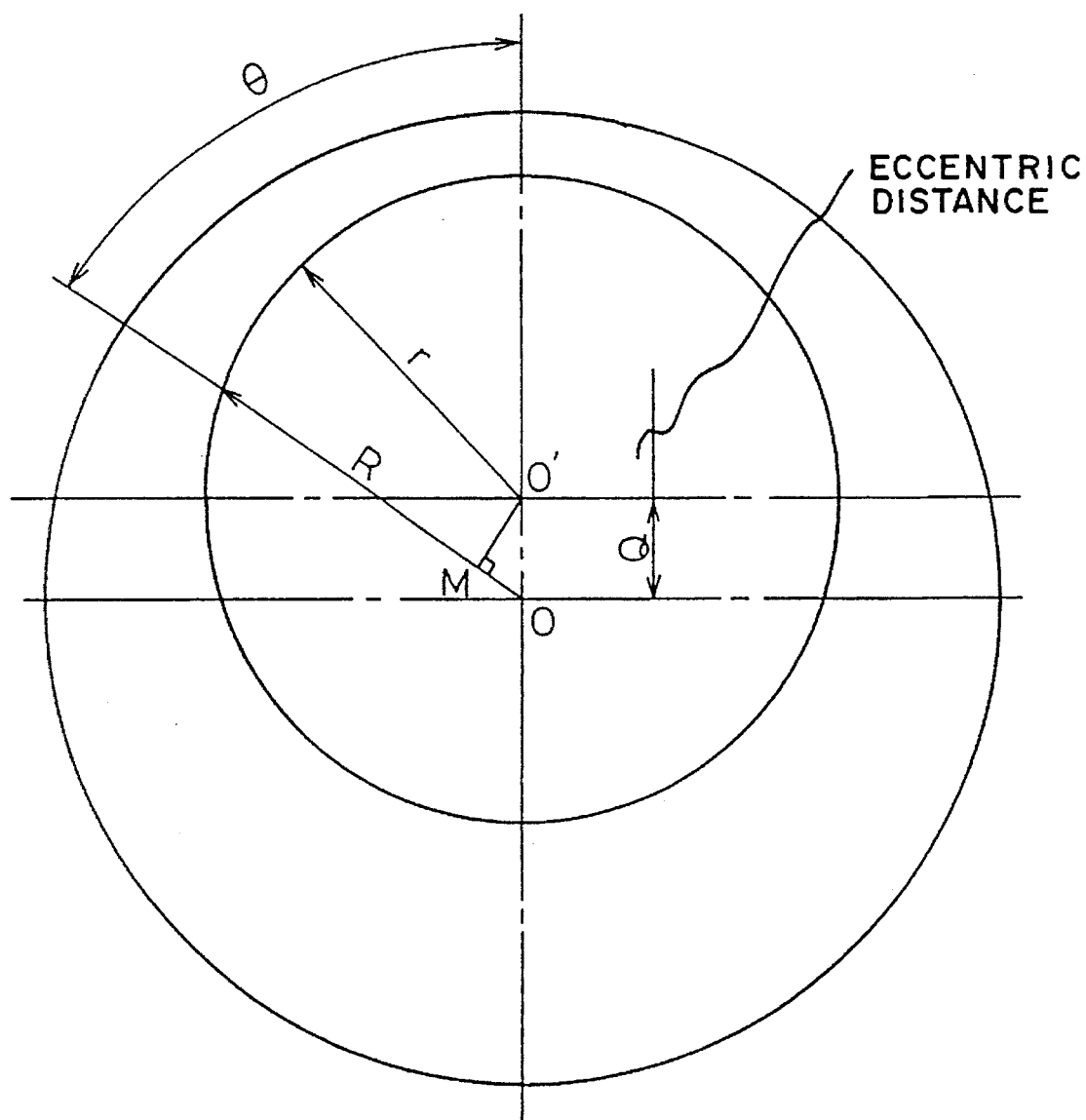
FIG. 9 schematic representation to explain the arrangement of the cam groove of the driving cam of the speed reducer shown in FIG. 7.

In the following, a description is made of the formula representing the configuration of the first cam groove 58 with respect to the angle θ about the axis of the speed reducer with reference to FIG. 9. If a perpendicular line is drawn from a center point O' of the first cam groove 58 to M, it may be seen that the formula representing the first cam groove, that is, a radial position R1 of the respective balls 48 is shown as follow, $$R1 = Q \cos \theta + r \cos (\sin^{-1} (Q \sin \theta)/r) \quad (1)$$

On the other hand, the configuration of the second cam groove 52 corresponds to a configuration illustrated by the radial movement of one of the balls 48. Each of balls 48 reciprocate n times in the respective ball slots 54 during one rotation of the follower cam 42. Thus, the formula representing the configuration of the second cam groove 52, that is a radial position R2 of the respective balls 48 is shown as follow, $$R2 = Q \cos \phi + r \cos (\sin^{-1}(Q \sin n\phi)/r) \quad (2)$$

It may be seen that if the rotational angle φ of the follower cam 42 is as follows with respect to the rotational angle θ of the driving cam 44, $$\theta = n\phi \quad (3)$$

then, always $$R1 = R2 \quad (4)$$

thus, the radial positions of the respective cam grooves, at which the respective balls 48 are positioned, correspond to each other.

Figure 10:
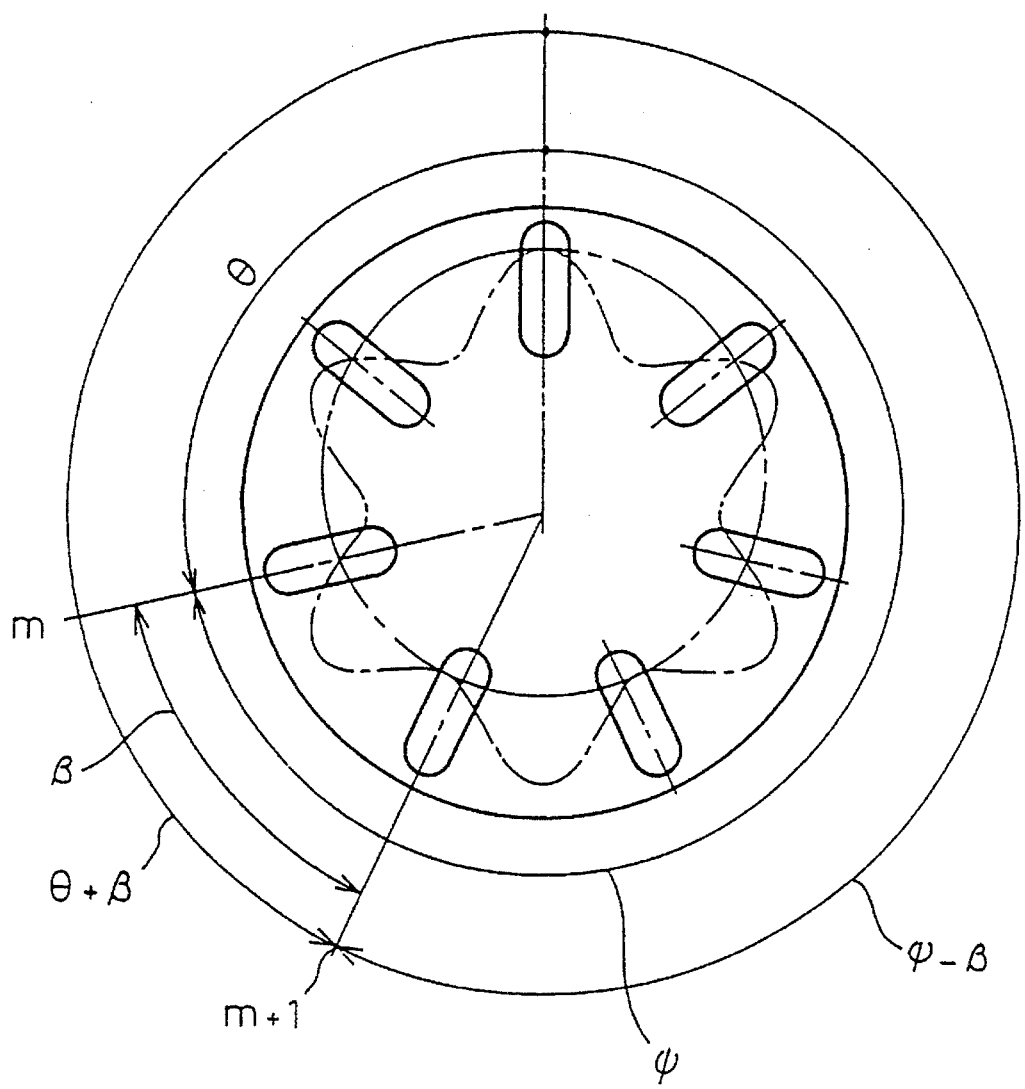
FIG. 10 schematic representation to explain the number of the slot required in the holder of the speed reducer shown in FIG. 7.

In the following, it is shown that there are always n+1 points where the radial positions, at which the respective balls 48 are positioned, of the respective cam grooves correspond to each other with reference to FIG. 10. FIG. 10 schematically illustrates the combination of the driving cam 44, holder 46 and the follower cam 48, in which the first and second cam groove 58, 52 are shown by a dotted line.

In FIG. 10, an assumption is made that the radial positions of the respective cam grooves, at which the respective balls 48 are positioned, correspond to each other, i.e. R1=R2, at the angle θ on the driving cam 44 and at the angle φ on the follower cam 42 (this angular position is identified by m).

A further assumption is made that the radial positions of the respective cam grooves, at which the respective balls 48 are positioned, correspond to each other again when the driving cam 44 rotates a further angle β about the axis of the speed reducer. It can be seen that the angular position of the follower cam 42 is represented by φ−β at this time since the follower cam 42 rotates in the reverse direction with respect to the rotation of the driving cam 44.

In order to comply with the equation (3) it is necessary that, $$\theta + \beta = n \cdot (\phi - \beta) \quad (5)$$

that is, $$\theta - n\phi = -(n+1) \cdot \beta \quad (6)$$

if θ is represented by the general angle θ=θ±2 mπ (m=1, 2, 3, . . . ) and the equation (3) is substituted for the equation (6) then, $$\beta = \pm 2 \, m\pi/(n+1) \quad (7)$$

that is, there are always n+1 points where the radial positions of the respective cam grooves, at which the respective balls 48 are positioned, correspond each other with respect to the reduction ratio of n.

In the following table, the variation of the radial position R2 of one of the balls 48 in the second cam groove 52 and the variation of the pressure angle α described below with respect to the rotational angle φ with the assumptions of the distance Q=14 mm, the radii r=72 mm.

TABLE 1

| φ (deg) | R2 (mm) | α (deg) |
| --- | --- | --- |
| 0.0 | 86.00 | 90.0 |
| 5.0 | 83.78 | 59.6 |
| 10.0 | 77.97 | 44.3 |
| 15.0 | 70.63 | 40.1 |
| 20.0 | 63.97 | 44.3 |
| 25.0 | 59.53 | 59.6 |
| 30.0 | 58.00 | 90.0 |
| 35.0 | 59.53 | 120.4 |
| 40.0 | 63.97 | 135.7 |
| 45.0 | 70.63 | 139.9 |
| 50.0 | 77.97 | 135.7 |
| 55.0 | 83.78 | 120.4 |
| 60.0 | 86.00 | 90.0 |

Figure 11C:
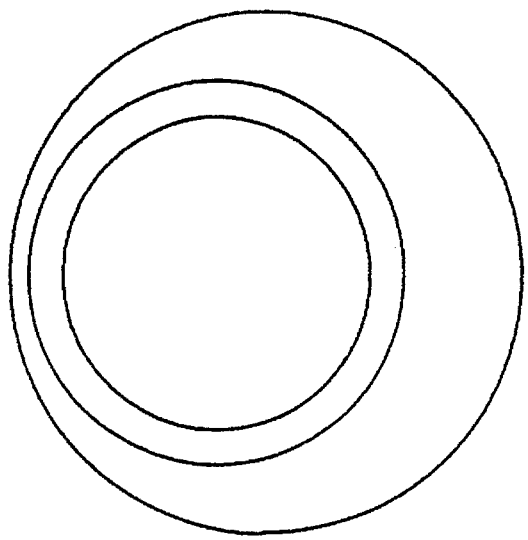
FIG. 11(a), 11(b) and 11(c) are front views of the follower cam, the holder and the driving cam of the speed reducer with the reduction ratio of 4:1 in accordance with the invention respectively.
Figure 11B:
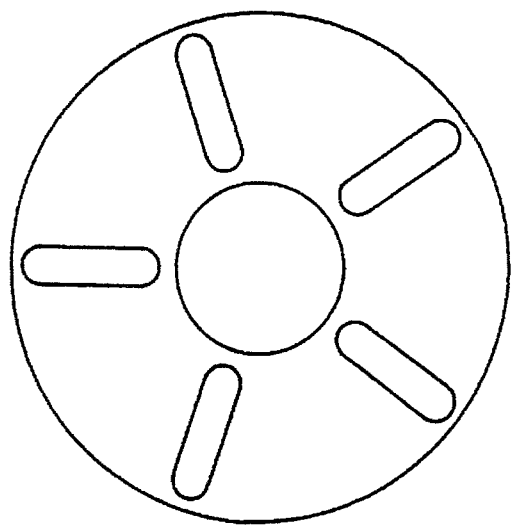
Figure 11A:
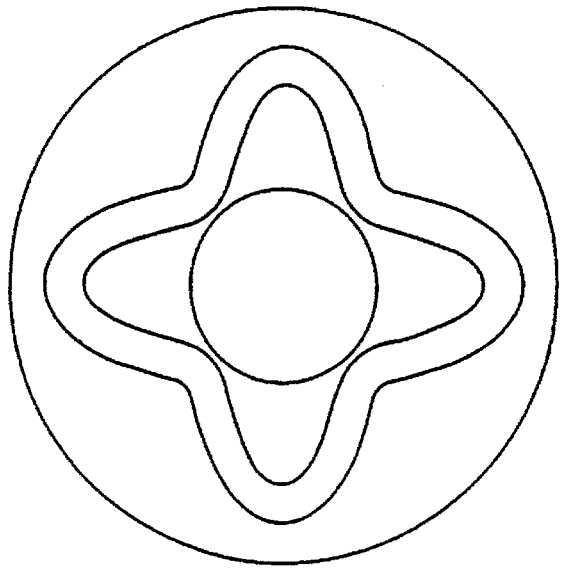
Figure 12C:
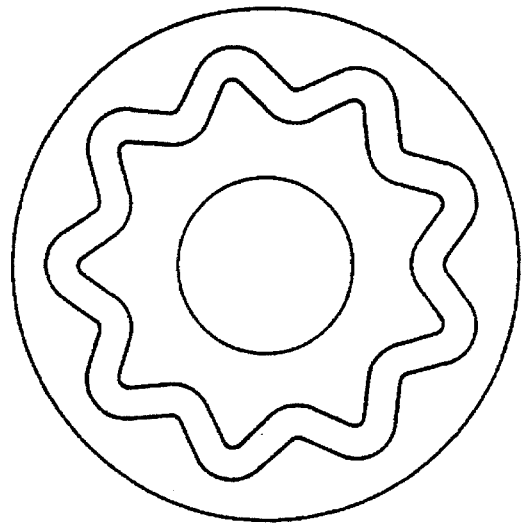
FIG. 12(a), 12(b) and 12(c) are front views of the follower cam, the holder and the driving cam of the speed reducer with the reduction ratio of 9:1 in accordance with the invention respectively.
Figure 12B:
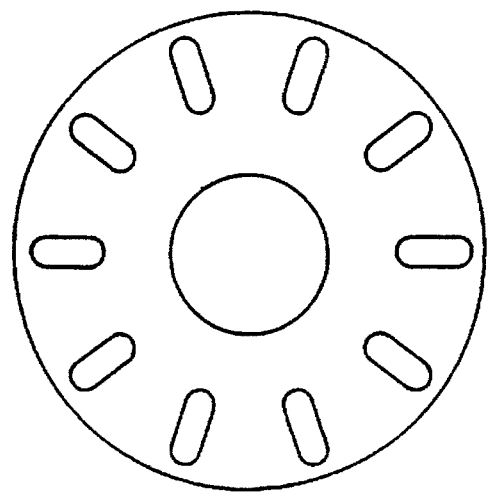
Figure 12A:
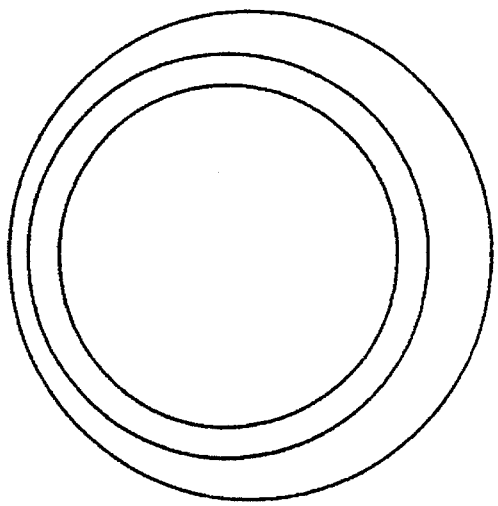

FIGS. 11 and 12 illustrate follower cams, holders and driving cams of speed reducers 39 with the reduction ratios 4:1 and 9:1 respectively formed by the same manner described above.

Figure 13:
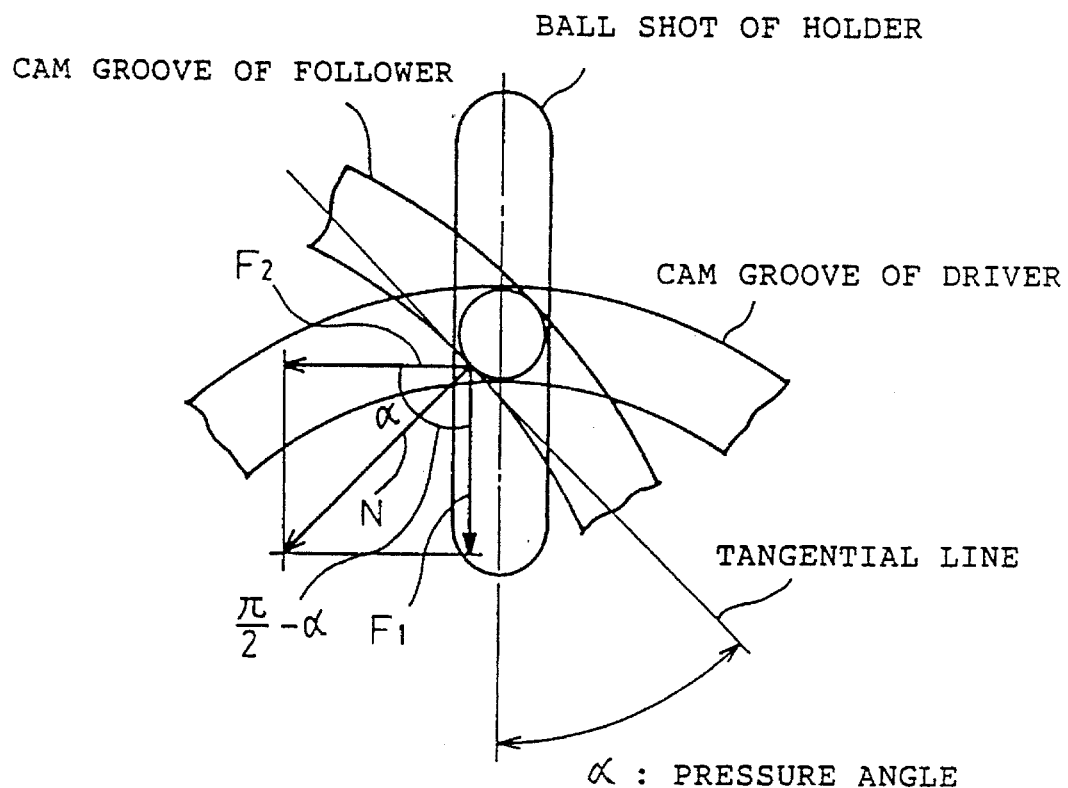
FIG. 13 is a schematic representation to explain the pressure angle.

In the following, a description is made of the pressure angle with reference to FIG. 13. FIG. 13 is a enlarged view of the ball slot 54 of the holder 46 in which the ball 48 is pressed in downward direction by the second cam groove 52 of the driving cam 44 and the ball presses the second cam groove 52 of the follower cam 44 at a tangent point T.

In FIG. 13, the ball 48 acts on the second cam groove 52 of the follower cam 42 at the tangent point T with pressure F1 in the longitudinal direction of t he ball slot 54. The pressure angle is defined as an angle between a tangential line at the tangent point T and a longitudinal axis of the ball slot. It can be seen from FIG. 13, pressure F2 perpendicular to the radial direction of the follower cam 42 is applied onto the follower cam 42 and is represented below. The follower cam 42 is driven by the pressure F2.

$$F2=(F1 \cdot \sin \alpha)/\cos (\pi/2-\alpha) \qquad (8)$$

If α=90 (deg) then F2=0. Thus, the no driving pressure is applied onto the follower cam 42. In practice, the experiments shows that if $$60° \leq \alpha \leq 90° \qquad (9)$$

then the pressure angle is excessively large and substantial driving pressure is not generated.

Figure 14:
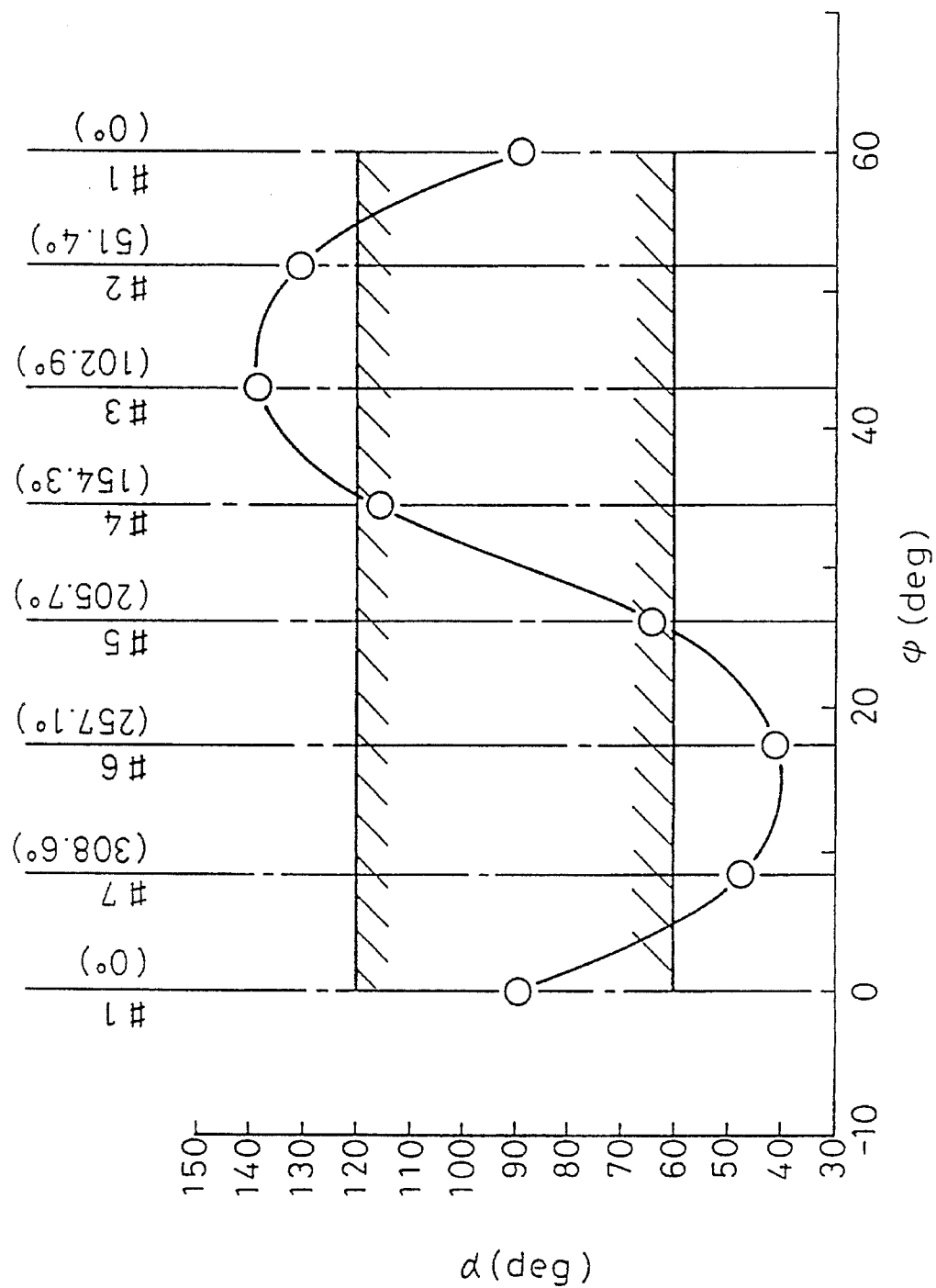
FIG. 14 is a graph illustrating variation of the pressure angle.

FIG. 14 illustrates a graph of the relation between the pressure angle α and the rotation angle φ of the follower cam 42 shown in TABLE 1. FIG. 14 is shown with respect one cycle of the rotational angle φ, that is, 0°≦φ≦60° and the corresponding positions of the balls are indicated by #1 to #7 respectively.

It can be seen from FIG. 14, three balls are within the angular region defined by the equation (9) and four balls drive the follower cam 42. The four balls are out of the angular region defined by the equation (9) and act on the follower cam 42 with driving pressure. Thus, the rotation of the driving cam 44 is transmitted to the follower cam 42.

On the other hand, when an external force is applied onto the follower cam 42, the rotational torque which is generated by the balls 48 moving in the radial direction is not transmitted to the driving cam 44 since the pressure angle of the first cam groove 58 is always more than 70°

Furthermore, the longer eccentric distance Q of the first cam groove 58 of the driving cam 44 results in the smaller minimum pressure angle. However, if the distance Q is made excessively long then a undercut portion appears in the second cam groove 52 of the follower cam 42. In the undercut portion, the balls 48 transmitting the driving pressure do not move continuously which leads to an inhibition of the smooth movement of the speed reducer 39. Therefore, the it is desired that the eccentric distance Q is as long as possible within the region in which the undercut portion does not appear.

Figure 15:
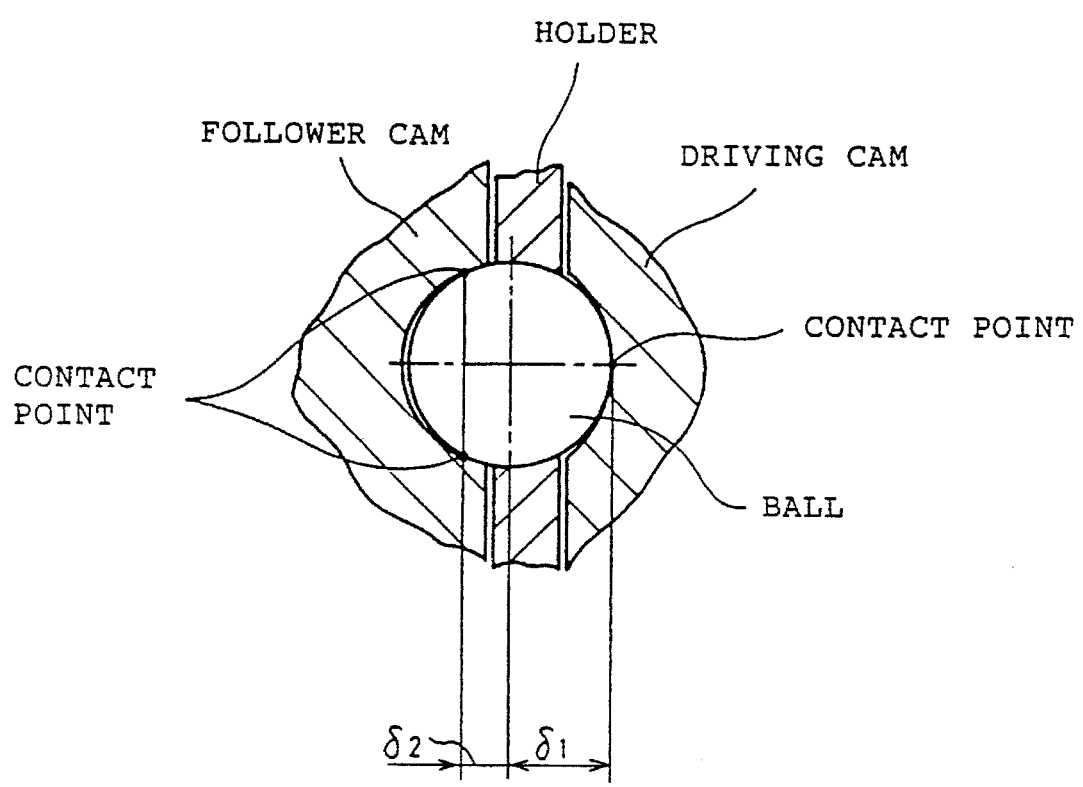
FIG. 15 is a schematic representation to explain the relation between the rotational center of the driving ball and respective contact points.
Figure 16:
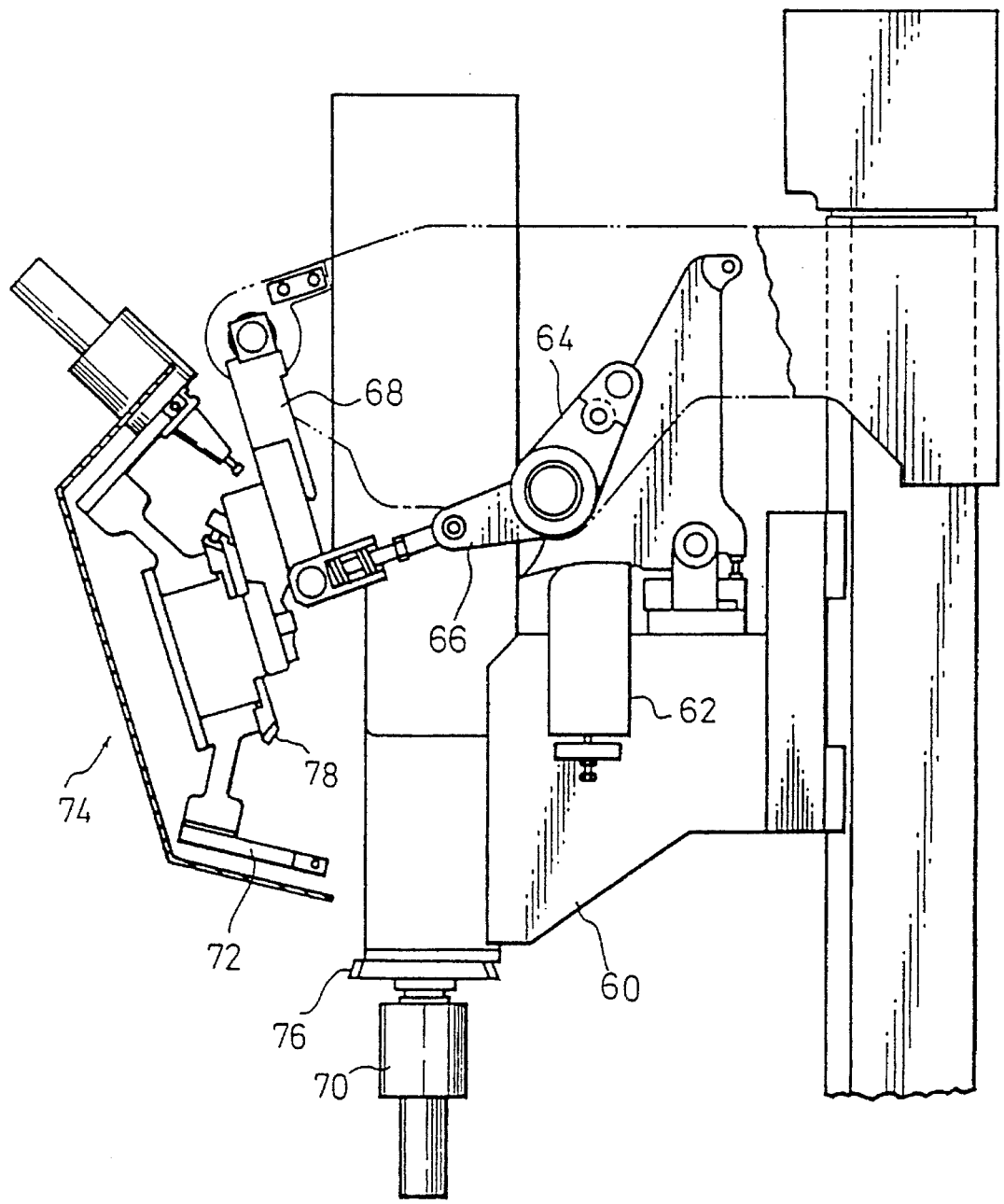
FIG. 16 is a side elevation of the conventional automatic tool changer.

As described above, the speed reducer in accordance with the invention transmits the rotation of the driving cam 44 to the follower cam 42. For this purpose, the balls 48 rotate between the first cam groove 58 of the driving side and the second cam groove 52 of the follower side which leads friction due to the difference of the peripheral velocity therebetween. This problem, however, can be considerably reduced by an arrangement in which the ratio of the distances δ1 and δ2 shown in FIG. 15 corresponds to reverse ratio of the length along the second cam groove 52 and the first cam groove 58. The distance δ1 corresponds to a distance between the rotational center of the ball 48 and the point at which it contacts the first cam groove 52. The distance δ2 corresponds to a distance between the rotational center of the ball 48 and the point at which it contacts the second cam groove 58.

It is apparent from the above description that the automatic tool changer in accordance with the invention can reduce the shock generated by the swing movement of the turret without reducing the velocity of the movement of the spindle head since the turret moves in the vertical direction relative to the spindle head when the turret swings for tool change and the movement of the turret reduces the relative velocity between the turret and the spindle head as much as possible. Thus, the tool change movement is ensured and the time for the tool change is reduced.

Furthermore, the automatic tool changer of the invention can change tools with reduced movement compared with the prior art when the turret draws out the tool holder from the spindle or mounts the tool holder on the spindle since the turret moves in the vertical direction with respect to the spindle head. This results in the time for tool change being reduced and in the dimensions of the automatic tool changer being reduced.

The invention provides a speed reducer which is compact and inexpensive. The speed reducer is suitable for mounting within a turret of an automatic tool changer. The speed reducer suitably rotates the turret without reducing the speed of the motor for the spindle of a machine tool, such as a CNC drill, excessively. This results in increasing the speed for indexing the turret. Furthermore, sufficient tolerance for driving the spindle is ensured.

The speed reducer provided within the turret of the automatic tool changer has a relatively high reduction ratio. The reduction ratio is an integral number and may be, for example 6 while the number of the tools held on the automatic tool changer may be, for example 10. Thus, the automatic tool changer in accordance with the invention can index one tool for one rotation of the spindle by appropriately selecting the number of teeth on the turret gear and on the spindle gear. This allows the automatic tool changer to avoid the orientation of the spindle which is carried out, in the prior art, after the indexing of the turret for matching the angular positions of the key on the spindle and of the key groove on the tool. Therefore, the automatic tool changer can reduce the time required for the tool change.

Furthermore, in the speed reducer in accordance with the invention, rotation is not transmitted from the follower cam to the driving cam when an external force is applied to the follower cam. Therefore, even if an external force is applied to the turret during the tool change operation, the turret driven by the speed reducer does not rotate. This ensures the safety of the automatic tool changer.

We claim:

1. An automatic tool changer for a machine tool, comprising:

a column;

a spindle head mounted to the column, said spindle head being slidable in a vertical direction;

a spindle supported in the spindle head and rotatable about a central vertical axis, the spindle being adapted to hold a tool for machining at an end thereof;

a slide member mounted to the column, said slide member being slidable in the vertical direction;

a turret for accommodating a plurality of tools for machining, the turret being rotatable about a center axis thereof to select a tool for a tool change, said turret being connected to said slide member so as to swing about a horizontal axis toward and away from the spindle;

a first cam means provided on the spindle head to move with the spindle head in the vertical direction;

a first cam roller means mounted on the turret to engage the first cam means, the turret swinging about the horizontal axis toward and away from the spindle through engagement between the first cam roller means and the first cam means when the spindle head moves in the vertical direction;

a link means for moving the slide member and the turret in the vertical direction, the link means having an arm member connected to the slide member for moving the slide member in the vertical direction, the arm member being pivotably mounted to the column;

a second cam means mounted to the spindle head to move with the spindle head in the vertical direction;

a second cam roller means mounted to the arm member of the link means so as to engage the second cam means, the arm member of the link means rotates through the engagement between the second cam roller means and the second cam means when the spindle head moves in the vertical direction, wherein a rotation of the arm member moves the slide member and the turret in the vertical direction; and the vertical movement of the spindle head, for the purpose of changing a tool held at the end of the spindle and a selected one in the turret, makes the turret swing toward and away from the spindle and move in the vertical direction through engagements between the first cam means and the first cam roller means, and the second cam means and the second cam roller means, wherein the vertical movement of the turret reduces a relative velocity between the second cam means and the second cam roller means to reduce a velocity of the swing, whereby shock generated during the tool change is reduced.

2. The automatic tool changer according to claim 1, wherein the first cam means is extended parallel to the central axis of the spindle and comprises first and second flat bearing faces and a third bearing face arranged between the first and the second bearing faces and having an externally convex configuration.

3. The automatic tool changer according to claim 2, wherein the first and the second flat bearing faces are integrally formed.

4. The automatic tool changer according to claim 2, wherein the first and second flat bearing faces are formed separately from each other.

5. The automatic tool changer according to claim 1, wherein said second cam means is of a type having a hook-shaped groove including a straight portion extended generally parallel to a central axis of the spindle and a curved portion.

6. The automatic tool changer according to claim 5, wherein the turret comprises a rotational shaft provided with a coaxial type speed reducer having a reduction ratio of a integral number of 2 or more.

7. The automatic tool changer according to claim 6, wherein the speed reducer comprises:

a plurality of ball means for transmitting a driving force, wherein said plurality of ball means corresponds to a reduction ratio of said speed reducer plus one;

a driving cam means containing a first cam groove which engages with the plurality of ball means and has a circular configuration, the center of the circle is eccentrically positioned with respect to an axis of the speed reducer;

a follower cam means containing a second cam groove having a plurality of convex and concave portions, the number of convex portions corresponding to the reduction ratio;

a holder means provided with a plurality of equally spaced radial grooves the number of which corresponds to the number of the reduction ratio plus one, each of the grooves allowing a respective ball means to move in the radial direction; and the driving cam means and the follower cam means connected to each other, with the holder means therebetween, sides of each of the cam means formed with respective grooves facing each other whereby rotation of the driving cam means is transmitted to the follower cam means, and reduced, through the plurality of ball means.

8. An automatic tool changer for a machine tool comprising:

a column;

a spindle head mounted to the column, said spindle head being slidable in a vertical direction;

a spindle supported in the spindle head and rotatable about a central vertical axis, the spindle being adapted to hold a tool to be used for machining at the end of the spindle;

a slide member mounted to the column, said slide member being slidable in the vertical direction;

a turret for accommodating a plurality of tools suitable for machining, the turret being rotatable about the center axis thereof to select a tool for a tool change, and being connected to the slide member so as to swing about a horizontal axis toward and away from the spindle;

a first cam means provided on the spindle head so as to move with the spindle head in the vertical direction;

a first cam roller means mounted on the turret so as to engage the first cam means, the turret swinging about the horizontal axis toward and away from the spindle through the engagement between the first cam roller means and the first cam means when the spindle head moves in the vertical direction;

a link means for moving the slide member and the turret in the vertical direction, the link means having an arm member connected to the slide member for moving the slide member in the vertical direction, the arm member being pivotably mounted to the column;

a second cam means mounted to the spindle head so as to move with the spindle head in the vertical direction;

a second cam roller means mounted to the arm member of the link means so as to engage the second cam means, the arm member of the link means rotates through the engagement between the second cam roller means and the second cam means when the spindle head moves in the vertical direction, the rotation of the arm member moves the slide member and the turret in the vertical direction;

wherein vertical movement of the spindle head, for the purpose of changing a tool held at the end of the spindle and the selected tool in the turret, swings the turret toward and away from the spindle and move in the vertical direction through engagements between the first cam means and the first cam roller means, and the second cam means and the second cam roller means, the vertical movement of the turret reduces a relative velocity between the velocity of the swing, whereby the shock generated during the tool change is reduced; and the turret comprising a rotational shaft provided with a coaxial type speed reducer having a reduction ratio of a integral number of 2 or more.

9. The automatic tool changer according to claim 8, wherein the speed reducer comprises:

a plurality of ball means transmitting the driving force, the number of the ball means corresponding to the reduction ratio plus one;

a driving cam means containing a first cam groove which engages with the ball means and has a circular configuration, the center of the circle is eccentrically positioned with respect to an axis of the speed reducer;

a follower cam means containing a second cam groove having a plurality of convex and concave portions, a number of convex portions corresponding to the reduction ratio;

a holder means provided with a plurality of equally spaced radial grooves, a number of which corresponds to the reduction ratio plus one, each of the grooves allowing the respective ball means to move in the radial direction; and wherein the driving cam means and the follower cam means are connected to each other, with the holder means therebetween, sides of each the cam means formed with the respective grooves facing each other whereby the rotation of the driving cam means being transmitted to the follower cam means, and reduced, through the ball means.

10. The automatic tool changer according to claim 9, wherein the driving cam means comprises a generally circular member with a turret gear means on a periphery thereof; and the spindle including a spindle gear means which engages the turret gear means to transmit a driving force from the spindle gear means to the driving cam means.

11. The automatic tool changer according to claim 10, wherein the reduction ratio of the speed reducer and the gear ration between the turret gear means and the spindle gear means are selected to allow the automatic tool changer to index one tool for an integral number of rotation of the spindle.

* * * * *